July 16, 1929.  J. S. KEEN ET AL  1,720,903
LOCOMOTIVE
Filed Feb. 9, 1927    9 Sheets-Sheet 4

Fig. 3ᵇ

Inventors
John S. Keen and
Frank B. Deans
by their Attorneys
Howson & Howson

July 16, 1929.  J. S. KEEN ET AL  1,720,903
LOCOMOTIVE
Filed Feb. 9, 1927  9 Sheets-Sheet 6

Inventors:
John S. Keen and
Frank B. Deans
by their Attorneys
Howson & Howson July 16, 1929. J. S. KEEN ET AL 1,720,903
LOCOMOTIVE
Filed Feb. 9, 1927  9 Sheets-Sheet 8

July 16, 1929.  J. S. KEEN ET AL  1,720,903
LOCOMOTIVE
Filed Feb. 9, 1927  9 Sheets-Sheet 9

Inventors
John S. Keen and
Frank B. Deans
by their Attorneys
Howson Howson

Patented July 16, 1929.

1,720,903

UNITED STATES PATENT OFFICE.

JOHN S. KEEN, OF PHILADELPHIA, AND FRANK B. DEANS, OF SHARON HILL, PENNSYLVANIA.

LOCOMOTIVE.

Application filed February 9, 1927. Serial No. 166,877.

Our invention relates to certain improvements in the frames and trucks of an oil-electric locomotive. The engine is known as the "Diesel" type, and consists of an internal combustion engine using crude oil or lighter distillates, a generator driven by the engine, and motors on the trucks connected to the generator.

The object of the present invention is to improve the construction of the frame of the locomotive and also the trucks supporting the frame.

In the accompanying drawings:

Fig. 3ª is an enlarged side view of the central portion of the locomotive;

Fig. 3ᵇ is an enlarged side view of the opposite end of the locomotive;

Fig. 4ª is a detail plan view of the central portion of the frame of the locomotive shown in Fig. 3ª;

Fig. 4ᵇ is a detail plan view of the opposite end of the locomotive shown in Fig. 3ᵇ;

Fig. 9 is a sectional view of the main frame on the line E—E, Fig. 4ª;

The frame 1 of the locomotive carries the cab and the driving mechanism, consisting in the present instance of an internal combustion engine of the "Diesel" type, blower, blow-motor and fan, as well as the fuel oil tanks.

The frame 1 is mounted on two trucks 2—2. The centre bearings 3—3 of the trucks are located under a body bolster at each end of the frame 1, see Fig. 1.

The trucks in the present instance are of the six-wheel type. The axles 4 of the wheels 5 of each truck are mounted in boxes 6, adapted to the pedestals of the side frames 7 of the truck. The side frames of each truck are connected together at their outer ends by the bumper frame 8 and at their inner ends by the transverse coupling head castings 9—9 and at each side of the centre bearings by cross-bars 10—10, which support the bearing-plates 11—11. At the centre of each plate 11 is the centre bearing 3.

Figure 5:
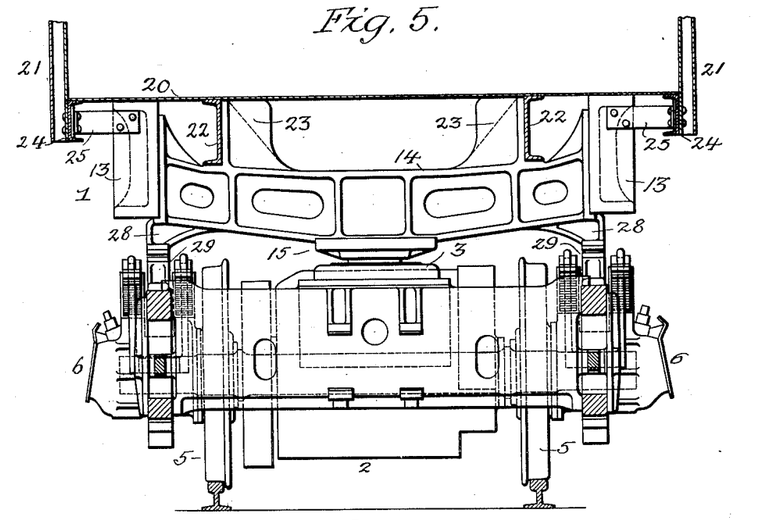
Fig. 5 is a sectional view on the line A—A, Fig. 4.

The main frame 1 consists of two longitudinal channel beams 13—13 of heavy construction, and these beams are connected by heavy end beams 14—14 which form the body bolsters and from each of which depends the body part 15 of the centre bearing which is adapted to rest upon each truck centre bearing 3 (see Fig. 5).

Figure 6:
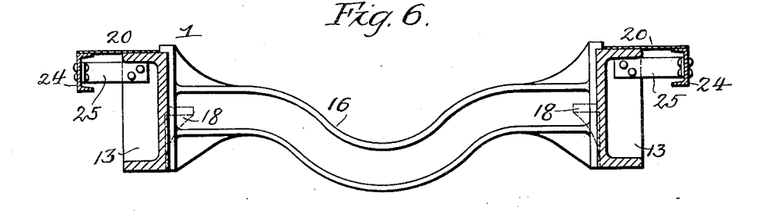
Fig. 6 is a transverse sectional view of the main frame on the line B—B, Fig. 4ª.
Figures 7, 8:
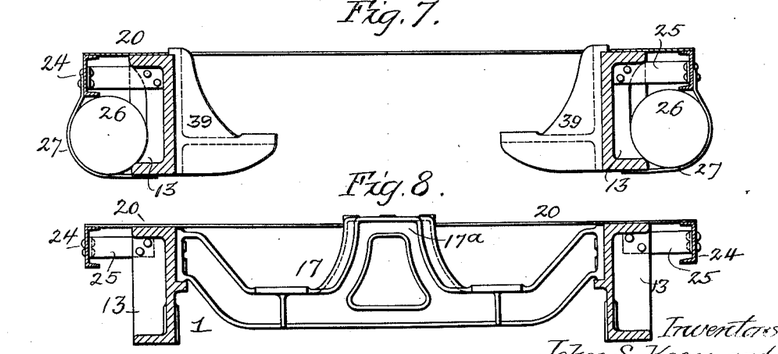
Fig. 7 is a transverse sectional view of the main frame on the line C—C, Fig. 4.
Fig. 8 is a sectional view on the line D—D, Fig. 4ª.
Figure 10:
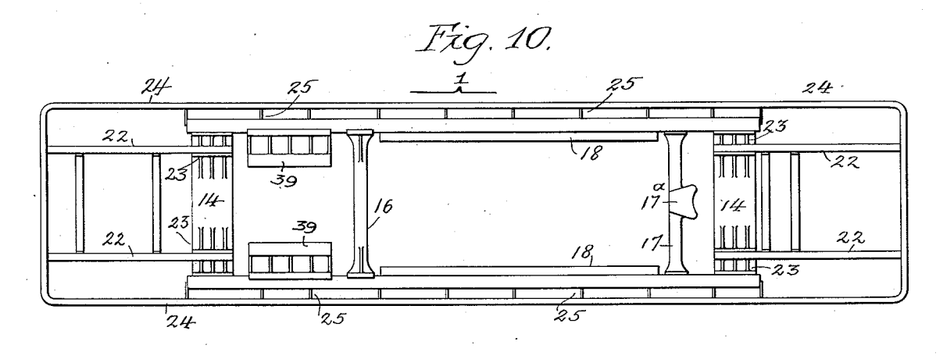
Fig. 10 is a detached plan view of the main frame.
Figure 11:
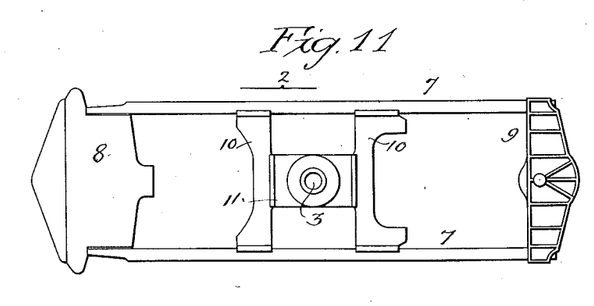
Fig. 11 is a detached plan view of one of the truck frames.

The longitudinal beams 13 are connected together intermediate of their ends by transverse beams 16 and 17 (see Figs. 6 and 8). These beams 16 and 17 are spaced apart to accommodate the internal combustion engine, the frame of which is mounted on the foot brackets 18 projecting from the longitudinal side beams 13—13 (see Fig. 9).

Extending from one side frame to the other and under the engine is a floor-plate 19 secured to the underside of the side frames. The main floor-plate 20 extends over that part of the main frame not occupied by the engine and generator and extends beyond the side beams to the side walls of the cab 21 as shown in Fig. 5.

Figure 1:
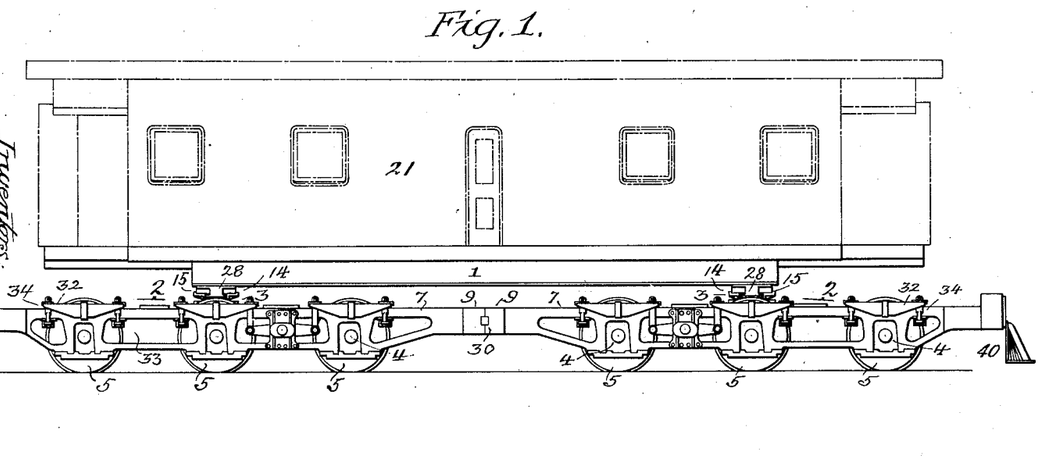
Fig. 1 is a side view of our improved oil-electric locomotive, showing the cab in dotted lines.

The cab 21, Fig. 1, extends beyond each end of the main frame 1, and to properly support the overhanging ends of the cab, two channel beams 22 are secured to flanges 23 projecting from the end body bolster beams 14, (see Fig. 5).

Extending around the entire main frame 1 is a light channel bar 24 which is secured at intervals to the side beams 13 by braces 25 and to the ends of the channel beams 22 which extend beyond the main frame at each end.

This channel bar 24 forms the support for the sides and ends of the cab 21 and supports the outer edges of the floor-plates 20.

Figure 3:
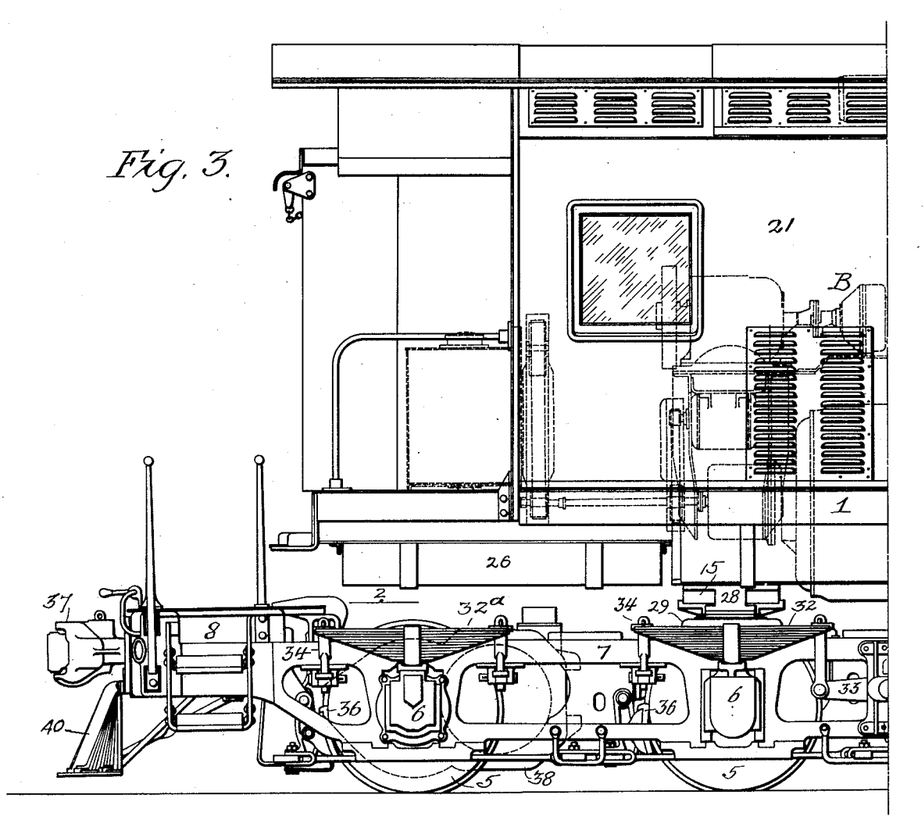
Fig. 3 is an enlarged side view of one end of the locomotive.

The extension of the floor of the cab beyond the side beams 13 of the main frame 1 allows the placing of fuel oil tanks 26 on the outer side of the main frame and under the floor 20, as shown in Figs. 3, 3ª, 3ᵇ and Fig. 7. The tanks are secured in position by straps 27 attached to the beams 13 and bar 24.

The body bolster beams 14 are very heavy and carry the weight of the main frame, the cab, and power mechanism within the cab. At each end of each beam 14 is an integral side bearing projection 28 which is directly above a truck side bearing 29.

Figure 3A:
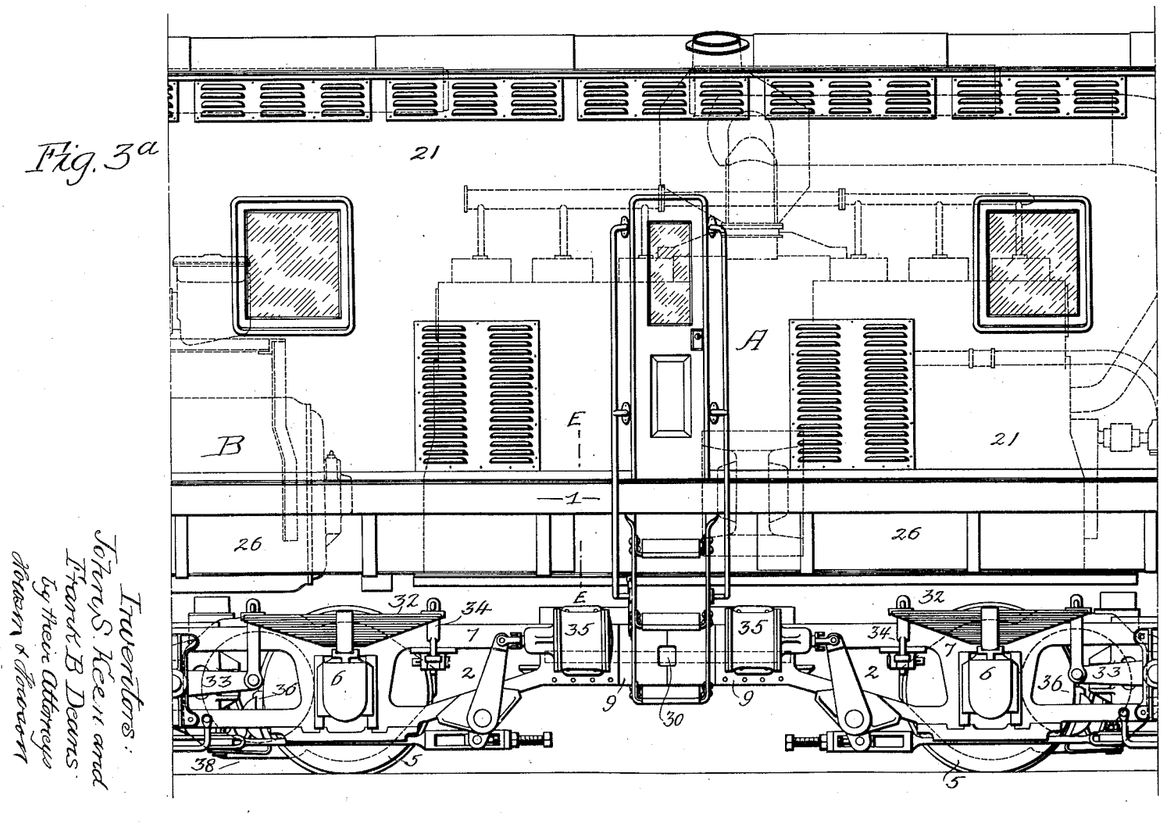
Figure 3B:
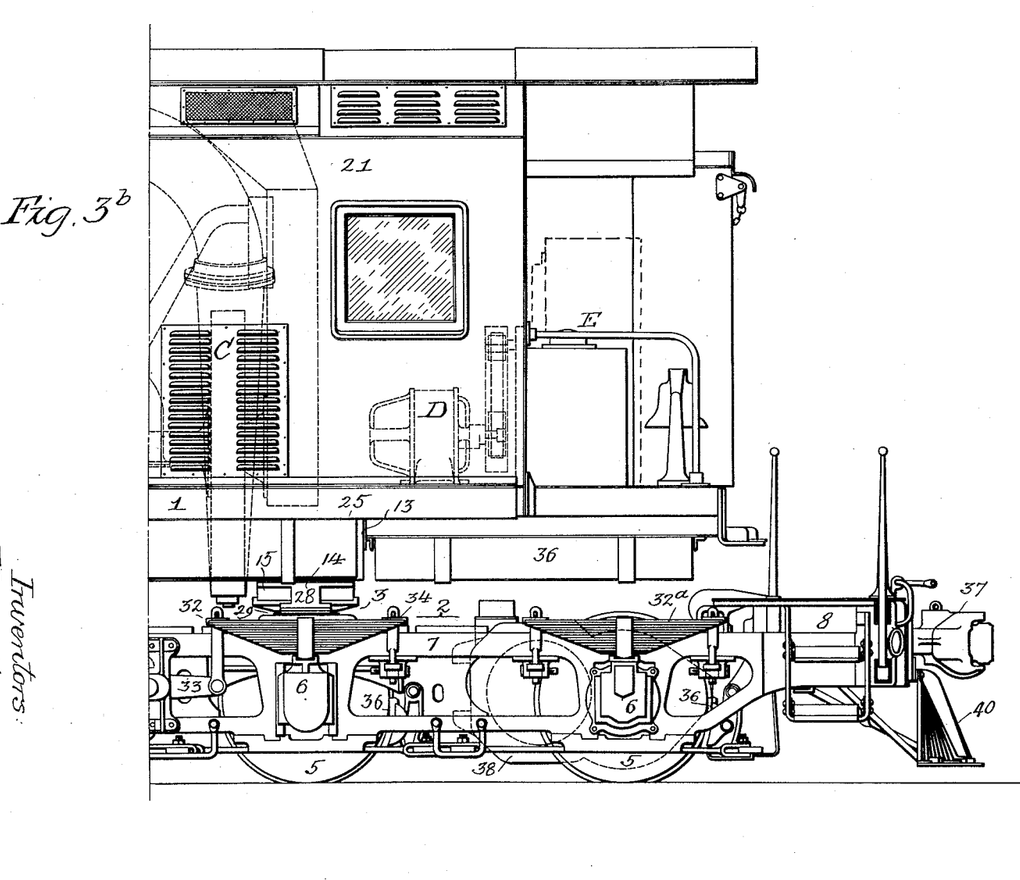

The power mechanism carried by the main frame is shown by dotted lines in Figs. 3, 3ª and 3ᵇ. A is an internal combustion engine preferably of the "Diesel" type. B is an electric generator driven by the engine. C is a blower. D is a blower motor, and E is a blower fan. The control mechanism is at each end of the cab.

Figure 4:
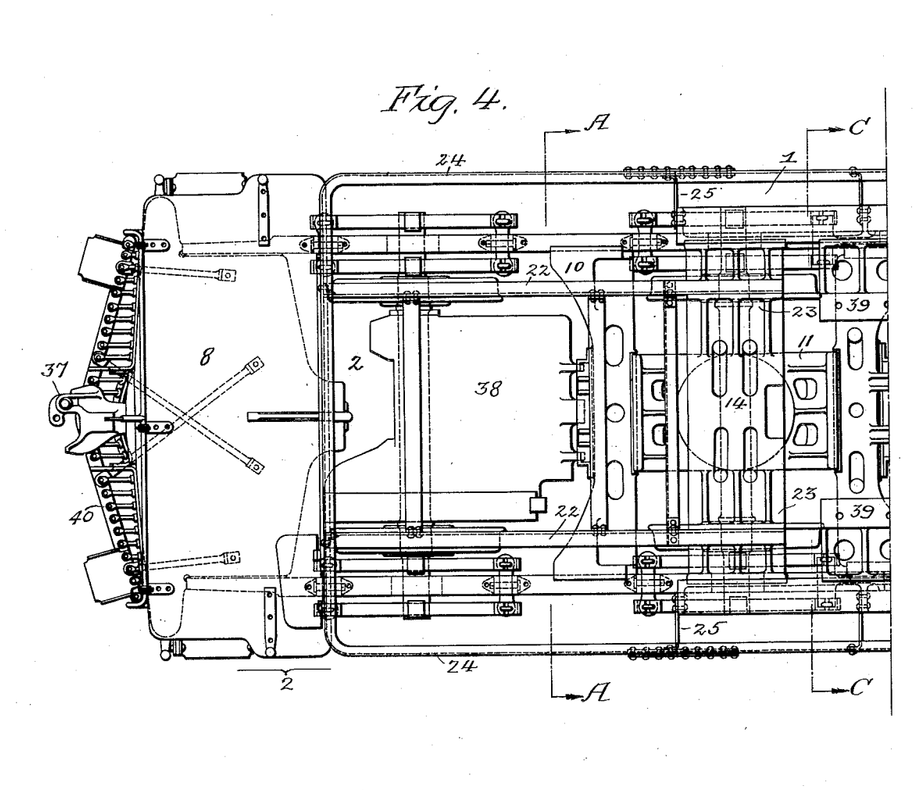
Fig. 4 is a detail plan view of one end of the locomotive shown in Fig. 3.
Figures 4A, 9:
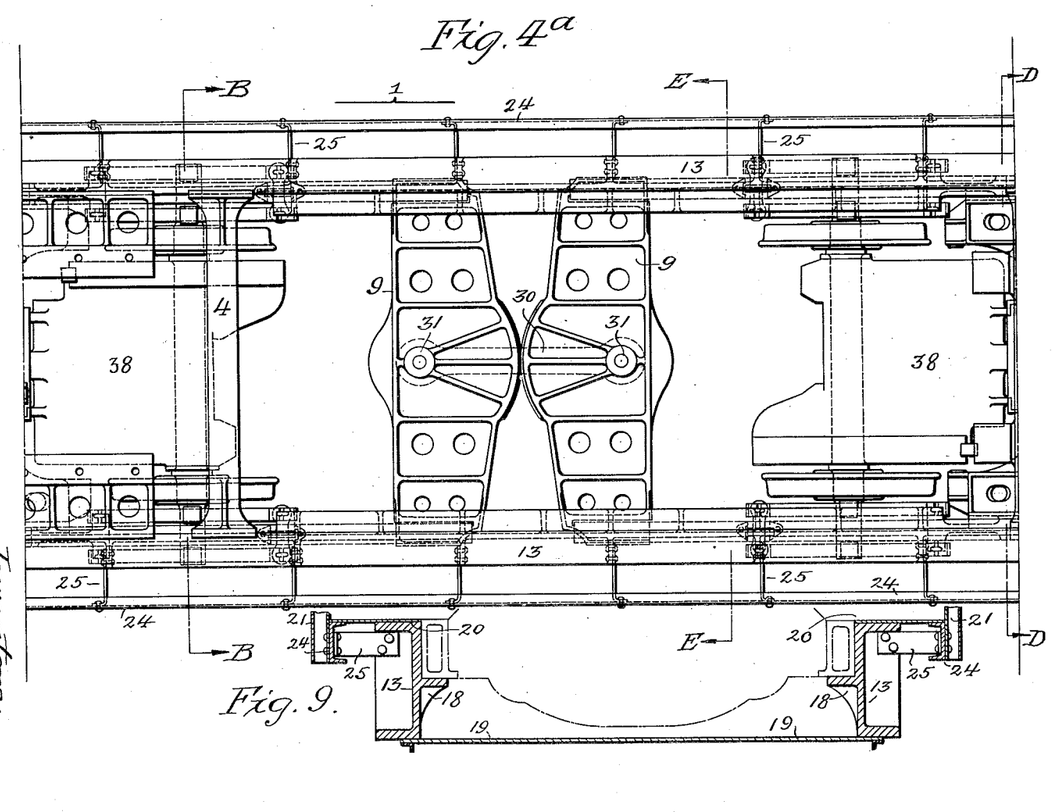
Figure 4B:
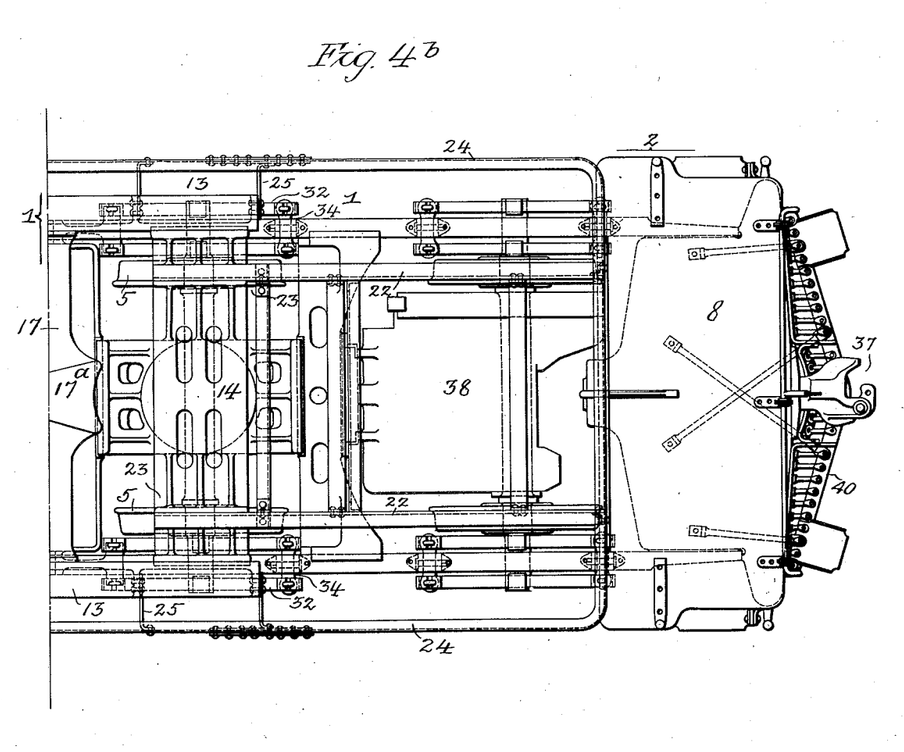

The two trucks are connected together by a link 30, shown by dotted lines in Fig. 4ª. Pins 31 extend through openings in the transverse coupling head castings 9 of the trucks.

The abutting portions of the couplings are segmental as shown, the curve being taken from the centre of the coupling pins so that they will ride against each other in passing around a curve.

On each truck is an equalizing gear of any suitable type. In the present instance the gear consists of springs 32 located on the axle boxes and connected to equalizing levers 33 pivoted to bearings on the frame. The outer end of each end spring is connected to the frame by a link 34. The outer end axle of each truck has individual springs 32ª.

The brake mechanism is of the air type in the present instance. The air cylinders 35 are mounted at the inner end of each truck, and the brake-shoes 36 are actuated through rods and levers shown in Figs. 3-3ª and 3ᵇ. The bumper 8 of each truck carries a coupling 37 and a fender 40.

Figure 2:
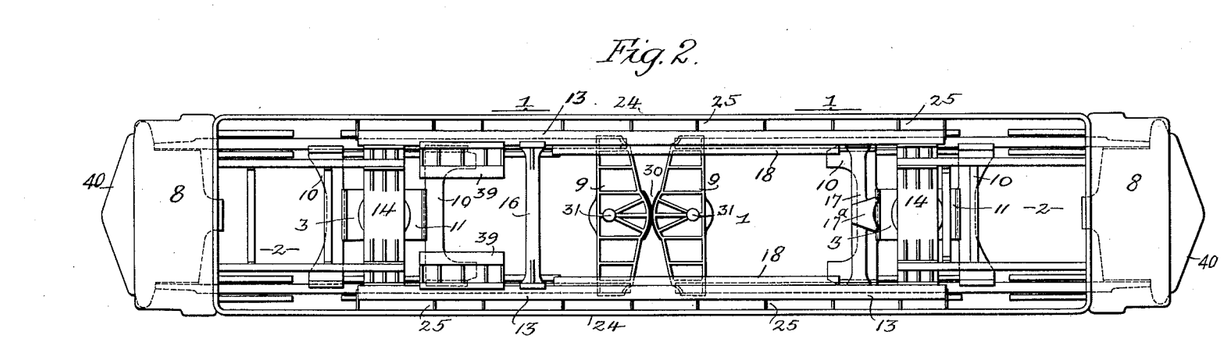
Fig. 2 is a plan view of the frame and trucks.

The electric generator B is carried by brackets 39 secured to or forming integral parts of the heavy side beams 13—13, as shown in Figs. 2 and 7.

The transverse beam 17 has a raised central portion 17ª which projects above the floor 20 in the present instance and supports the blower C.

The electric motors 38 are mounted on certain of the axles 4 of each truck and are geared to said axles. The outer ends of the motors are supported by cross-bars in the usual manner.

In the present instance there are two motors on each truck. These motors are geared to the end axles of the truck. The intermediate axle is not driven but it is simply a carrying-axle.

The hereinabove described main frame and trucks can be built very substantial and comparatively light considering the load to be carried, and the particular arrangement of parts allows the locomotive to readily pass around ordinary curves, as the wheel base of each truck is short, while the cab overhangs the outer end of each truck so that the cab is not cramped for room.

The weight of the engine and generator is carried by the heavy beams of the main frame between the centre bearings of the two trucks.

We have not shown the wiring between the generator, nor the control and the motors, as any standard arrangement may be used.

We claim:—

1. The combination in a locomotive, of a main frame consisting of heavy channel beams at each side; transverse bolsters at each end of the frame and attached to the channel beams; a longitudinal foot bracket on the inner side of each channel beam for a motor; brackets projecting inwardly from the beams for the support of an electric generator; and trucks upon which the main frame is mounted.

2. The combination in a locomotive, of a main frame consisting of two longitudinal channel beams; bolster beams connected at each end of the channel beams; intermediate connecting bars; means on the channel beams for supporting an internal combustion engine and an electric generator; extension beams attached to the bolsters and projecting beyond the ends of the main frame and arranged to carry the overhanging portion of the cab; and two trucks pivotally mounted under the bolsters.

3. The combination in a locomotive, of a main frame consisting of two longitudinal channel beams connected together at each end by bolster beams; a truck mounted under each bolster beam; two beams secured to the bolster beams and projecting beyond the main frame; and an outside channel bar extending entirely around the main frame and the extended beams and forming a support for the cab of the locomotive.

4. The combination in a locomotive, of a main frame consisting of two longitudinal channel beams connected together at each end by bolster beams; a truck mounted under each bolster beam; two beams secured to the bolster beams and projecting beyond the main frame at each end; an outside channel bar extending entirely around the main frame and the extended beams and forming a support for the cab of the locomotive; and bars connecting the side portions of the channel bar to the main beams of the frame, the end portions of each channel being secured directly to the beams which project beyond the ends of the main frame.

5. The combination in a locomotive, of two trucks; beams for connecting the inner ends of the trucks together so that they will articulate, the outer ends of each truck having a bumper-frame; a main frame consisting of side beams and transverse bolster beams, said bolster beams being at each end of the main frame and supported directly on the centre bearing of the truck; a cab extending beyond the end of the main frame so as to overhang the outer ends of each truck; and means projecting from the main frame for supporting the cab.

6. The combination in a locomotive, of a main frame; a floor mounted on the main frame and extending beyond the sides thereof; bars to which the outer edges of the floor are secured, said bars also carrying the cab of the locomotive; fuel oil tanks located along the outside of the main frame and under the floor; and means for holding the said tanks in position.

7. The combination in a locomotive, of a main frame consisting of longitudinal side beams and transverse bolster beams; and trucks for supporting the main frame, said side beams having foot brackets projecting inwardly below the tops of said beams for an engine of the locomotive.

8. The combination in a locomotive, of a main frame; trucks carrying said frame, said main frame being formed by longitudinal side beams and transverse end bolster beams; and intermediate transverse beams, one of said intermediate transverse beams having a centrally located projecting portion forming a support for a blower frame.

9. The combination in a locomotive, of a main frame consisting of longitudinal side beams and transverse bolster beams; and trucks for supporting the main frame, the longitudinal side beams having two sets of brackets projecting inwardly below the tops of said beams, one set of brackets designed to support an engine and the other set designed to support an electric generator of the locomotive.

JOHN S. KEEN.
FRANK B. DEANS.